US008737640B2

(12) United States Patent
Li et al.

(10) Patent No.: US 8,737,640 B2
(45) Date of Patent: May 27, 2014

(54) SYSTEM, METHOD AND APPARATUS WITH ENVIRONMENTAL NOISE CANCELLATION

(75) Inventors: Yuepeng Li, Beijing (CN); Fenghai Qiu, Beijing (CN); Hua Gao, Beijing (CN)

(73) Assignee: C-Media Electronics Inc., Taipei (TW)

( * ) Notice: Subject to any disclaimer, the term of this patent is extended or adjusted under 35 U.S.C. 154(b) by 720 days.

(21) Appl. No.: 12/986,330

(22) Filed: Jan. 7, 2011

(65) Prior Publication Data

US 2012/0045074 A1 Feb. 23, 2012

(30) Foreign Application Priority Data

Aug. 17, 2010 (CN) .......................... 2010 1 0257704

(51) Int. Cl.
*H04B 15/00* (2006.01)

(52) U.S. Cl.
USPC .......................... 381/94.1; 381/71.1; 704/233

(58) Field of Classification Search
USPC ........... 381/71.1, 71.11, 71.12, 57, 94.1, 111, 381/94.3; 375/285, 254, 346; 704/219, 225, 704/226, 233; 455/63.1, 67.3, 296, 570, 455/303; 708/404, 405
See application file for complete search history.

(56) References Cited

U.S. PATENT DOCUMENTS 6,549,586 B2 4/2003 Gustafsson et al.
7,587,056 B2 9/2009 Zhang
2001/0016020 A1* 8/2001 Gustafsson et al. .......... 375/346
2006/0153360 A1* 7/2006 Kellermann et al. .... 379/406.08
2008/0069372 A1* 3/2008 Zhang et al. .................... 381/92
2008/0069374 A1* 3/2008 Zhang .......................... 381/94.1
2009/0089054 A1* 4/2009 Wang et al. ................... 704/233
2010/0020980 A1* 1/2010 Kim ............................. 381/71.1
2010/0169103 A1* 7/2010 Pulkki ........................... 704/500
2011/0096937 A1* 4/2011 Zhang et al. ............... 381/71.11

* cited by examiner

*Primary Examiner* — Vivian Chin
*Assistant Examiner* — Friedrich W Fahnert
(74) *Attorney, Agent, or Firm* — Rosenberg, Klein & Lee

(57) ABSTRACT

Disclosed herein are system, method and apparatus with environmental noise cancellation. The instant disclosure is particularly adapted to a receiver module having at least two inputs. The two inputs respectively receive a main audio portion and the audio with majority of environmental noise. The system firstly calibrates the audio signals to reduce the error caused by the difference between the two inputs. An adaptive beamforming technology and a speech extractor are respectively used to extract the environmental noise portion with less main audio and the main audio portion with less noise. After a process of time-to-frequency domain transformation, a non-linear noise suppression technology is introduced into estimating the environmental noise and acquiring a gain. After noise suppression processed with the gain, a sequence of audio signals is output after a frequency-to-time domain transformation.

20 Claims, 8 Drawing Sheets

203

SYSTEM, METHOD AND APPARATUS WITH ENVIRONMENTAL NOISE CANCELLATION

BACKGROUND OF THE INVENTION

1. Field of the Invention

The instant disclosure relates to a method, a method, and an apparatus with environmental noise cancellation, in particular, a real-time noise suppression procedure is introduced to the system or the related apparatus with a microphone array for providing an improved voice quality.

2. Description of Related Art

For acquiring a solution regarding distress caused by environmental noise during a call procedure, an aspect of dual-microphone array has been developed for suppressing the noise. The related noise cancellation scheme particularly introduces a primary microphone for receiving the voice and the nearby noise, and a secondary microphone installed with a distance from the primary one for receiving the sound with majority of environmental noise. The signals received by the two microphones can be used to effectively suppress the noise in order to improve the call quality.

Reference is made to FIG. 1 depicting a communication device having two microphones in a conventional scheme. Such as an example illustrated in U.S. Pat. No. 6,549,586, the communication device has two microphones such as a first microphone 101 distanced at a distance from a user's mouth and a second microphone 102 installed near the mouth. Main function of the first microphone 101 is to collect the background noise since it has the distance from the mouth, however the first microphone 101 may also receive the speech. The second microphone 102 is mainly collecting the voice. The difference between the two microphones serves as the function of noise suppression.

In the current example, in order to suppress the background noise collected by the first microphone 101, the signals are firstly buffered in a first memory 103. A first subtractor 105 is functioned to enhance the estimation of background noise. Further, the main signals of voice and background noise collected by the second microphone 102 are buffered in the second memory 104. The second subtractor 106 refers to the background noise estimated by the first subtractor 105 through the delay circuit 107. The subtractor 106 therefore enhances the suppression of the background noise collected by the second microphone 102.

Further in the example, the shown third subtractor 108 then simultaneously receives the estimated background noise collected by the first subtractor 105 and the speech estimated by the second subtractor 106. After that, subtractor 108 obtains the speech signals after noise suppression through parameters adjustment. The signals are output to an inverse fast Fourier transform (IFFT) 109 which transforms the signal at discrete time to the continuous signals at frequency domain. An overlap-and-add unit 110 then combines the signals and produces speech signals.

Based on the aspect of the microphone array described in FIG. 1, U.S. Pat. No. 7,587,056 owned by Fortemedia™ for the purpose shows an array microphone apparatus and a noise suppression method thereof. Some further processes, including signal calibration, beamforming, noise estimation, and suppression, and time-frequency domain transformation, were provided to obtain improved call quality.

Some disadvantages of the conventional arts are obviously shown. For example, the quality requirements of microphones are high since the conventional technology lacks effective calibration. Further, a high gain matching scheme is required to the microphone since fixed-type beamforming circuit is used to extract the speech. Still, a lot of noises are mixed up with the speech by the fixed-type beamforming, so the noise suppression may be affected, and the speech may be distorted if any noise-suppression is performed thereon.

SUMMARY OF THE INVENTION

For acquiring improved call quality, disclosed in the instant disclosure is particularly a system with environmental noise cancellation and a method which embodies an online signal calibration, an adaptive beamforming technology, and a non-linear noise suppression. In addition to eliminating error caused by hardware difference between the microphones or the disposing positions, the noise can be highly minimized and the efficiency of noise suppression can be proved.

According to the embodiment of the disclosure, the system with environmental noise cancellation is preferably adapted to a receiver module having two or more inputs. One input of the receiver module is configured to receive main audio portion having majority of speech or specific audio. The other input substantially receives environmental noise. In an example in the disclosure, an apparatus with a microphone array is introduced. The microphone array includes at least a first microphone module and a second microphone module.

The signals received by each microphone module are transformed to the system. A calibration unit, which is used to calibrate the definition of each microphone module for collecting the speech, receives the signals firstly. Therefore, the calibration may reduce the error caused by variation between the microphone modules. An adaptive beamforming technology is used to adjust the signals. In comparison with a threshold, the signals with less main audio portion are obtained. A speech extracting unit then performs filtering for extracting out the main audio portion.

After that, both the signals with main audio and the signals with environmental noise are simultaneously transformed from time domain into frequency domain. A noise-suppression unit then performs a non-linear noise suppression to generate a gain for suppressing the noise. This gain may effectively minimize the noise.

In the process of extracting speech and suppressing the noise, any generated information may feedback to the front end of the system. The feedback may be reference for the calibration. That feedback may be the information concerning whether or not the signals are the speech or environmental noise.

Next, the inverse frequency-domain transformation unit may use the gain to regulate the input signals, and then transform those signals to time domain. Further, a sequence of output audio signals is formed by means of processes of overlapping, adding and summing.

According to one of the embodiments, the disclosed noise suppression method for the microphone array receives the audio signals collected by the microphone array, and the system confirms a gain based on if the previous audio has the main audio portion or the portion of environmental noise. The gain may be used for calibrate the current audio.

Since the signals undergo the gain matching, the signals then go through a beamforming process. A preset threshold is introduced to adjusting the degree of filtering for effectively obtaining the portion of environmental noise.

The step then compares the calibrated main audio portion of the signals with the environmental noise portion, and one further threshold is incorporated to adjusting the filtering effect. Therefore, the main audio portion can be extracted.

After the domain transformation, the step optionally performs smoothing and decimating operations in order to obtain a suitable signal resolution. In particular, a non-linear noise suppression operation is used to estimate the level of environmental noise from the two sets of signals in the frequency domain. Further, the result may be used to adjust the gain. This gain is particularly used for processing the noise suppression upon the audio signals in the frequency domain.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

According to one of the embodiments, the system and method are mainly applied to a receiver module which has two or more inputs. The inputs may have two or more microphone modules. The receiver module includes the microphone array with the two microphone modules. The receiver module particularly collects the audio from at least two different positions. By means of the software or hardware implementation, the system may estimate the background noise and acquire improved quality of audio or the speech signals.

The instant disclosure may advantages that the system can be effectively functioned to suppress the environmental noise, and therefore enhance the definition and comfortability during a call procedure. Further, the system with environmental noise cancellation may perform an instant signal calibration during the call procedure. After a general experiment, the system may tolerate ±6 dB gain difference for the microphone system. Still further, the system introduces an adaptive beamforming technology into retrieving the regular audio such as the speech, and greatly suppressing the noise mixed in the audio. The adaptive beamforming technology advantages the modules with non-linear noise suppression to raise their performances.

Besides the environmental noise cancellation is applied to the microphone system, any device having the receiver module may also conduct the technology of noise cancellation. The technology may also be configured to apply to a microphone array with multiple microphones, but not limited to the above applications.

Figure 1:
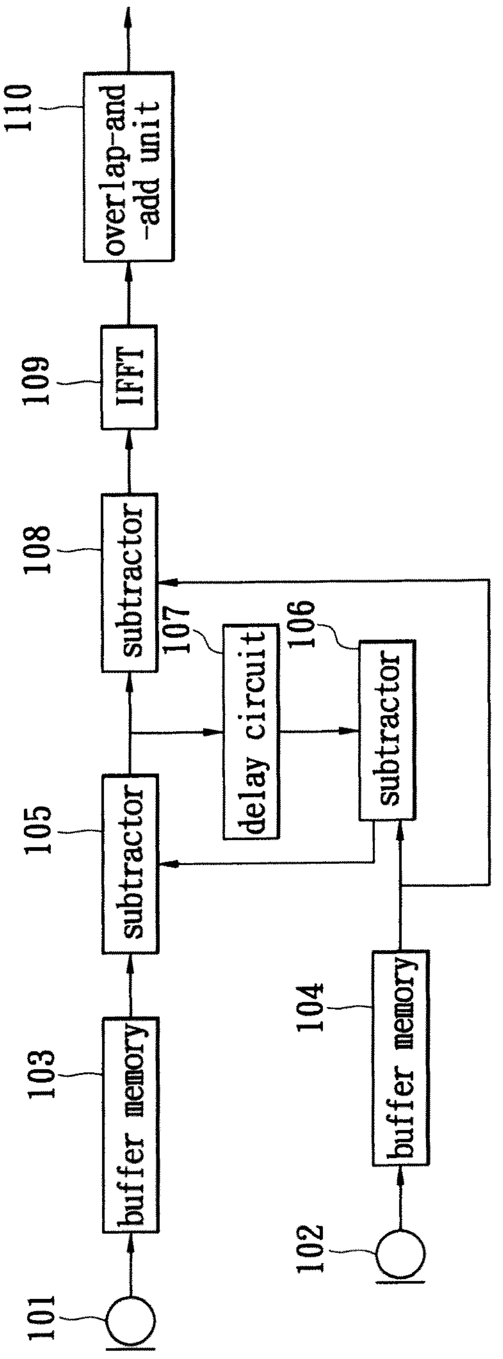
FIG. 1 PRIOR ART
FIG. 1 shows a circuit diagram of dual-microphone device of the conventional technology.
Figure 2:
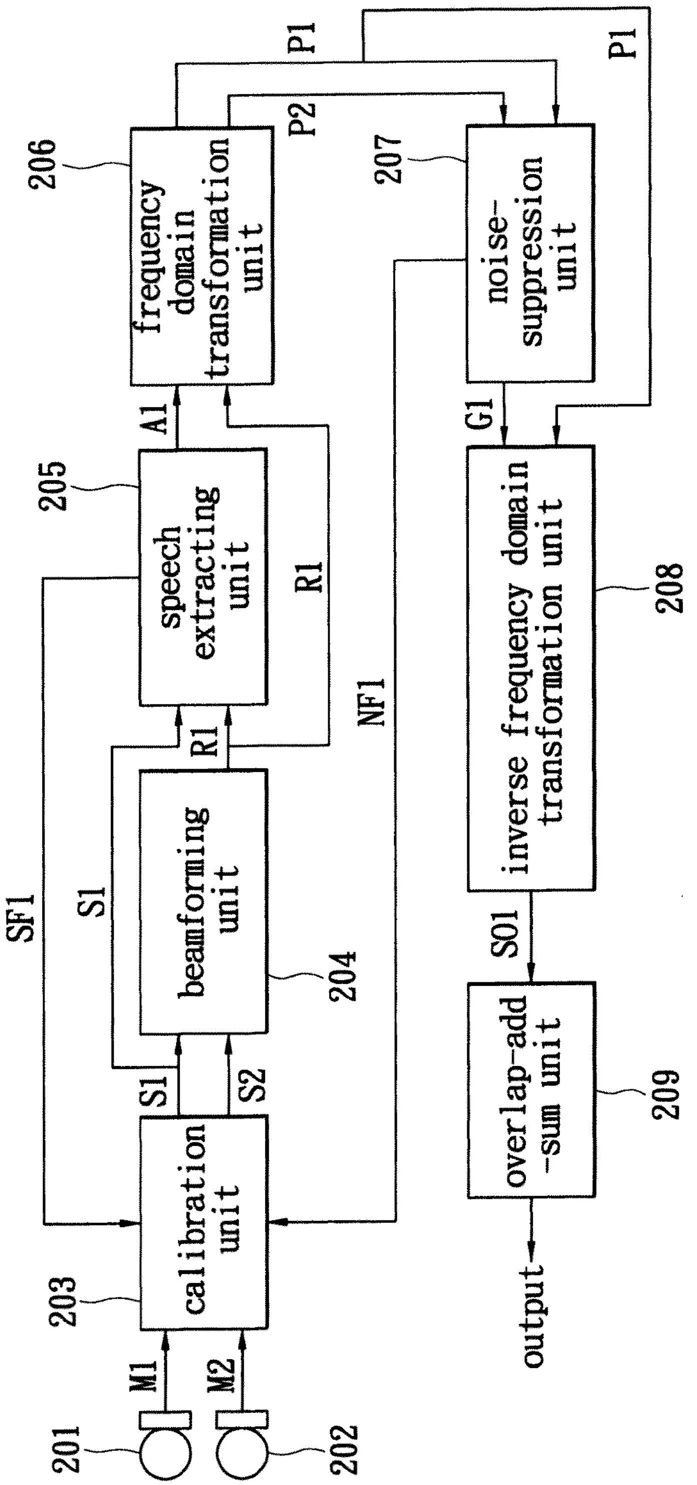
FIG. 2 shows modular function blocks illustrating the system with environmental noise cancellation in accordance with the instant disclosure.

Reference is made to FIG. 2, which depicts the function blocks illustrating the modular system of environmental noise cancellation.

In an example, a receiver module having two inputs is employed to receive the signals with majority of audio and the other signals mainly with environmental noise. In particular, a microphone array with a first microphone module 201 and a second microphone module 202 is exemplarily disclosed.

The first microphone module 201 is particularly configured to collect the audio, or any specific sound. The first microphone module 201 is preferably installed near mouth if this module 201 is used for a communication device. The second microphone module 202 is otherwise for collecting the environmental noise. The module 202 may be installed at a distance from the first microphone module if it is for the communication device to minimize the level of the audio.

The signals received by each of the microphone modules are transmitted to the system. The system in accordance with the instant disclosure may be embodied as an IC, or by means of software. The system includes a calibration unit 203 capable of real-time calibrating the audio received by the receiver module, a beamforming unit 204 enabled to adjust the received energy as required, a speech extracting unit 205 used for extracting the main audio, a frequency domain transformation unit 206, such as variable frequency resolution transformer, VFRT, for performing time-domain/frequency domain transformation, a noise-suppression unit 207 enabled to perform non-linear noise suppression, an inverse frequency domain transformation unit 208, such as inverse variable frequency resolution transformer, for performing inverse frequency-domain transformation unit, and an overlap-add-sum unit 209 used to execute an overlap-add-sum operation. Those abovementioned units are electrically interconnected.

One input of the receiver module, such as the first microphone module 201, may be installed at the position closer to the source of main audio. This module 201 receives the signals mainly from the audio source. The second microphone module 202 serves as the other input which may be installed in a distance far from the audio source, and mainly collects the environmental noise, and however some speech signals may be included. The signals collected respectively from the microphone modules 201, 202 are labeled as M1 and M2.

The signals labeled with M1 and M2 are separately transmitted to the calibration unit 203, which is coupled with the receiver module. The embodiment of the microphone array mainly calibrates the definition for collecting audio of each microphone module based on the information of the main audio or environmental noise received by the system. The system employs the speech extracting unit 205 to generate SF1 for confirming that the audio is the main audio portion, and the noise-suppression unit 207 to generate NF1 for confirming the environmental noise. The definition calibration is to minimize the variation between the microphone modules. It is noted that the variation may be resulted from hardware design, manufacturing procedure, or difference among the circuits. The calibration of inputs may confirm the signal quality. The mentioned information related to the main audio or environmental audio are respectively labeled as NF1 and SF1 determined by the back-end components of the system.

After the calibration by the calibration unit 203, signals S1 indicative of main audio portion and S2 indicative of the environment audio portion are transmitted to the beamforming unit 204 coupled with the calibration unit 203. The direction or angle receiving the audio of each microphone module dominates the energy received by the module. To obtain more energy suitably, the beamforming technology may be incorporated into the system for adjusting the angle of microphone. The sound waves collected by the microphone array assembled with several microphone modules may be interfered with each other. As a result, an interference pattern can be created. The design of the system is to fit to match a suitable interference pattern.

Speech signals or the signals R1 with comparatively few main audio can be generated after the signals processed by the beamforming unit 204. In the diagram, the signals S1 indicative of the main audio portion and signals R1 with few main audio are simultaneously transmitted to the speech extracting unit 205. This speech extracting unit 205 essentially performs a filtering process for comparing the signals S1 and R1. The output signal SF1 is fed back to the calibration unit 203 to be the reference of later calibration. The step is to determine whether the current audio includes the speech signals to be collected or any other specific audio. For example, SF1=0 indicates the audio with most environmental noise; SF1=1 represents that the audio is with the speech signals or other specific signals. After that, the system outputs the signals A1 undergoing the speech extraction.

The frequency-domain transformation unit 206 is coupled with the speech extracting unit 205 for receiving the signals R1 with comparatively few main audio portion and the signals A1 after speech extraction. On the other word, the frequency-domain transformation unit 206 respectively receives the signals with main audio portion and the environmental noise portion. In the meantime, a time-to-frequency domain transformation is processed to transform the signals in time domain into the signals in frequency domain. Preferably, a fast Fourier transformation is provided to process the transformation, and generate the frequency-domain signals P1 and P2.

Next, the noise-suppression unit 207 receives frequency-domain signals P1 and P2 from the frequency-domain transformation unit 206. The signals P1 and P2 are applicable to be references for estimating environmental noise. A gain for noise suppression is then generated, and labeled as G1, A signal NF1 is further generated for indicating the signals of noise, and fed back to the calibration unit 203 for signals calibration.

The inverse frequency-domain transformation unit 208 receives the gain signal G1 and frequency-domain signal P1. The gain signal G1 is as a basis for interpolation. The inverse fast Fourier transformation is performed on the signals G1 and P1 to transform the frequency-domain signals to the time domain. After that, time-domain signals SO1 are then generated.

At last, the signals SO1 at each period are summed by the overlap-add-sum unit 209, and a sequence of audio signals are output.

The operations conducted by the above-mentioned modules may be referred to the following figures and flow chart. The each module may be implemented by means of software or tangible circuits.

Figure 3:
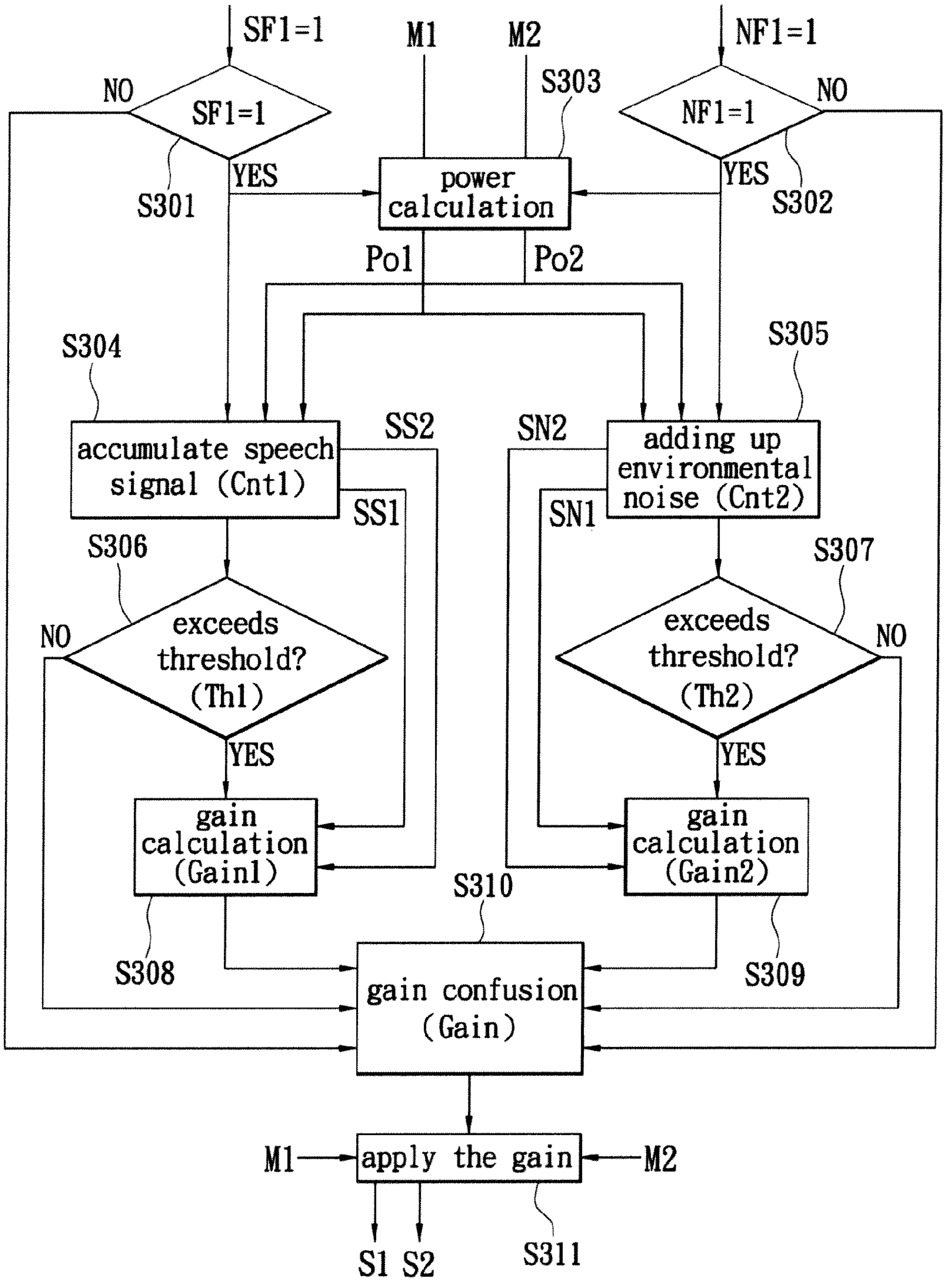
FIG. 3 is a flow chart illustrating the operation of a calibration unit of one of the embodiments in accordance with the instant disclosure.

FIG. 3 illustrates a flow chart of one of the embodiments of the calibration unit (203) of the environmental noise cancellation system. The system firstly receives the signals M1 and M2 generated by the first microphone module 201 and the second microphone module 202. The signals M1 are the signals with majority of main audio portion. The signals M1 may be the collection of both speech signals and environmental noise. The signals M2 are the signal with majority of the environmental noise, as well with few speech signals.

In step S301, the symbol SF1 represents the signals generated by the speech extracting unit 205. The signals SF1 are processed with a speech extracting process. Reference is made to the content contained in the signals SF1, as a result, the signals are mainly with the environmental noise (no) if SF1 is equal to 0. The method then goes to step S310. The signals contain the speech signals or specific audio (yes) if SF1 is equal to 1. Those signals are all conducted to be references of calculation as they are taken to step S303. In next step S304, the signals are referred to perform addition and summation.

On the contrary, such as step S302, NF1 indicates the signals fed back from the noise-suppression unit 207. The fed-back signals are used to confirm whether the signals are environmental noise or not. If NF1 is equal to 0 (no), it is determined that the current signals are with main audio portion. Step S310 is to perform gain integration. If NF1 is equal to 1 (yes), those signals are taken to step S303 and to be referred to calculate the power. Alternatively, the signals are sent to step S305, and to be the reference for adding up or summing the environmental noise.

In step S303, the process is to calculate the powers of signals M1 and M2, and the corresponding energy Po1 and energy Po2 are respectively generated. The energies Po1 and Po2 are respectively to be the basis for determinations in steps S304 and S305.

In step S304, if the received signals are mainly the speech signals or specific signals, its to accumulate the number of times (Cnt1). If the accumulated times (Cnt1) does not exceed a threshold (Cnt1<Th1) (no), the process performs the step S310. If the number of times exceeds the threshold (yes), the process goes to step S308 for calculating the gain (Gain 1).

After adding up the energies of the main audio portion of the signals Po1 and Po2 (step S304), the information is recorded in the signals SS1 and SS2. In step S306, when the number of times of the signals with the main audio portion (Cnt1) exceeds the threshold (Cnt1>=Th1), the gain (Gain 1) for the signals SS1 and SS2 can be obtained (step S308).

On the other hand, the flow at right side of the figure shows the process to conduct the signals with the environmental noise. After calculating the powers Po1 and Po2, the information associated with the signal NF1 is obtained. In which, the signal without the environmental noise is designated as NF1=0, and the signal with the environmental noise is otherwise designated as NF1=1. In step S305, the number of times of signals with the environmental noise is counted as Cnt2, and the related power can be obtained by accumulation. The information thereto is recorded to signals SN1 and SN2.

When the number of times for the environmental noise reaches another threshold (Cnt2>=Th2), the process goes to step S309. A gain (Gain2) is then calculated according to the information taken by signals SN1 and SN2. Otherwise, the process may go to step S310 if the number does not yet each the threshold (Cnt2<Th2).

The step S310 is for processing a gain fusion. The gains Gain1 and Gain2 are obtained by referring to the signals SF1 and NF1, which respectively indicate the information of the main audio portion and environmental noise portion. To integrate the information, a final gain (Gain) is acquired. There are several ways to define the gain (Gain).

Since the audio signals continuously enter the system, such as step S310, the system sometimes merely has the information of Gain1, and sometimes the Gain2. If there is no any information from Gain1 or Gain2, the final gain (Gain) is set as 1. The way to calculate Gain, Gain1 and Gain2 may be implemented by a well-known scheme.

At last, such as step S311, the Gain may be applied to the signals M1 conducted by the first microphone module and the signals M2 by the second microphone module. The output signals S1 and S2 are then obtained after gain controls.

Figure 4:
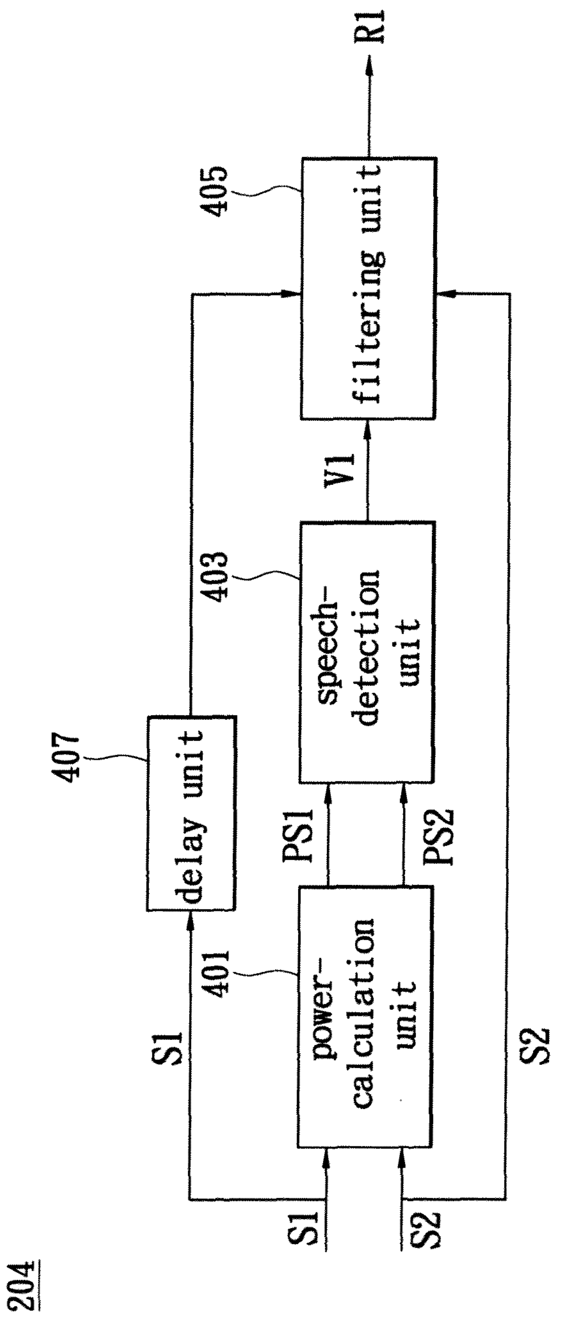
FIG. 4 shows modular function blocks of a beamforming unit of the system in accordance with the instant disclosure.

Reference is made to the block diagram of FIG. 4 illustrating the modular beamforming unit 204 in accordance with the present disclosure. It is noted that the each block may be implemented by means of software, or alternatively by tangible circuits.

The shown beamforming unit 204 receives the signals S1 and S2 after gain control. The power-calculation unit 401 calculates the powers indicative of signals PS1 and PS2 for each end. The speech-detection unit 403 then detects the main audio portion including speech or other specific audio.

In one of the embodiments, the speech-detection unit 403 firstly determines whether the difference between the signals PS1 and PS2 is larger than a preset threshold, such as the mentioned first preset threshold. This preset threshold is used to define a parameter V1, which is conducted to control the filter coefficient of the filtering unit 405. Through the delay unit 407, the signals S1 and the signals S2 directly entering the filtering unit 405 can be postponed. This filtering means may produce the signals R1 with fewer speech signals.

Figure 5:
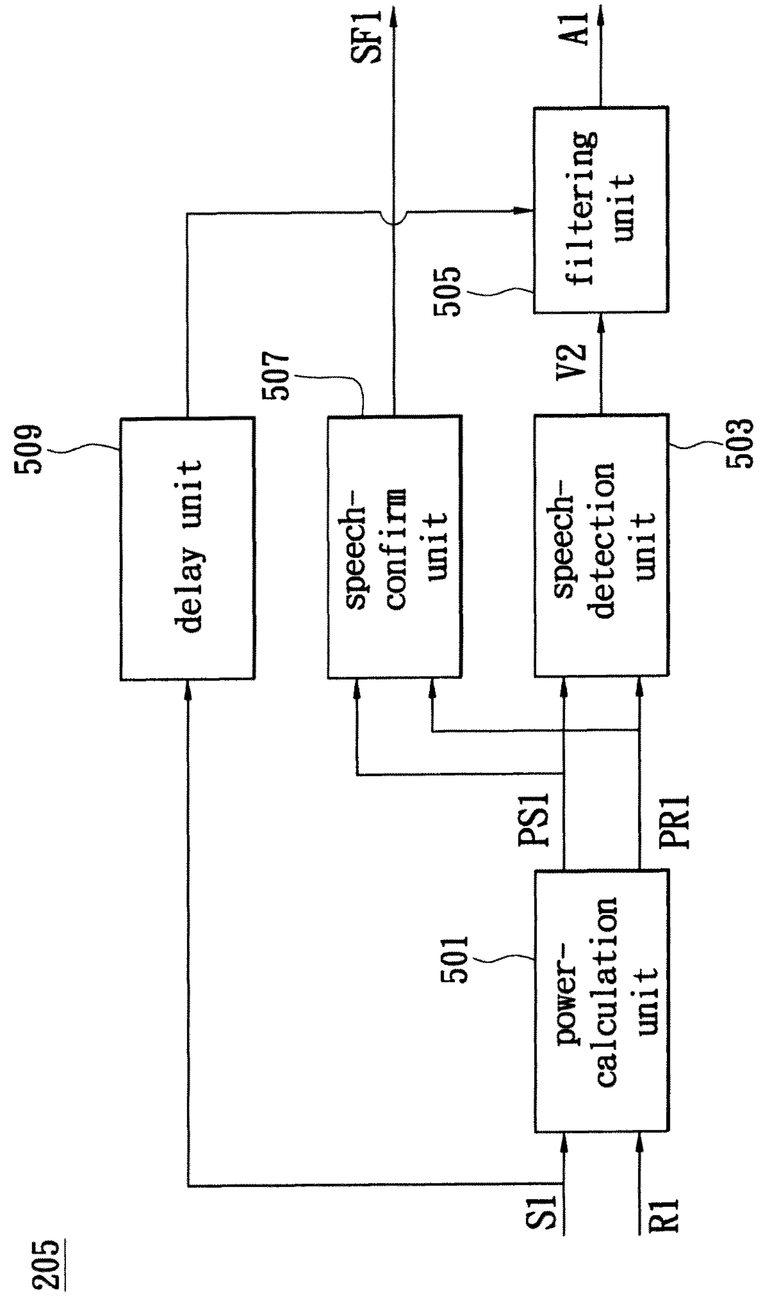
FIG. 5 shows function blocks of a speech extracting unit of the system in accordance with the instant disclosure.

Further reference is made to FIG. 5 illustrating the modular blocks of the speech extracting unit 205. The speech extracting unit 205 can be implemented by software or any tangible circuits.

Next, the speech extracting unit 205 receives the signals R1 with fewer speech signals (mainly the environmental noise) and the signals S1 mainly the main audio portion after undergoing the gain control. The power-calculation unit 501 respectively calculates the each power for both signals R1 and 51. The signals PS1 from previous power-calculation unit 401 of beamforming unit 204 and PR1 are then produced. The speech-detection unit 503 then determines whether the difference between the energies of signals PS1 and PRI is larger than another threshold, such as the second preset threshold. A parameter V2 is accordingly generated for controlling the filter coefficient of the filtering unit 505. In particular, the process may provide an adaptive effect of filtering.

The shown filtering unit 505 simultaneously receives the signals S1 and R1 after the delay unit 509. The signals A1 mainly with the main audio portion are output.

The speech extracting unit 205 includes a speech-confirm unit 507 that is used to retrieve the signals PS1 and PR1. The speech-confirm unit 507 can determine if the signals are mainly the speech or the specific audio. If the signals are the speech or the specific audio, the signal SF1 is set as 1; otherwise, SF1 is set as 0. This signal SF1 is fed back to the front-end calibration unit 203 for further calibration of the microphone.

Figure 6:
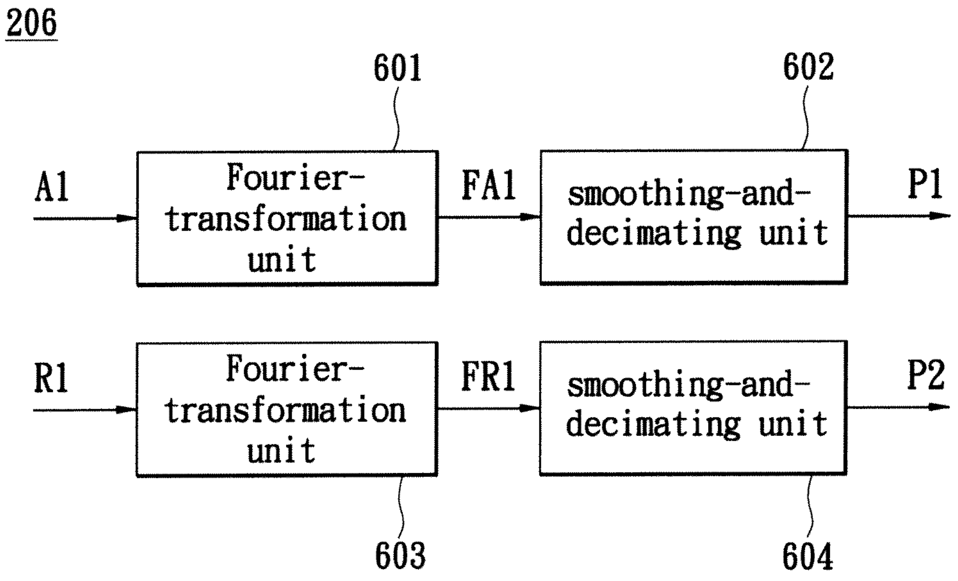
FIG. 6 shows function blocks of a frequency-domain transformation unit of the system in accordance with the instant disclosure.

FIG. 6 further shows the functional blocks of the modular frequency-domain transformation unit 206.

The frequency-domain transformation unit 206, which is implemented by software or tangible circuits, receives the signals A1 and the signal R1 with few speech signals. These signals A1 and R1 are respectively performed by a fast Fourier transformation by the Fourier-transformation units 601 and 603. The frequency-domain signals FA1 and FR1 are then generated. During the signal transformation, a sampling mechanism is introduced into reducing computing load. The signals FA1 and FR1 are then undergoing smoothing and decimating operations through the smoothing-and-decimating units 602, 604. Therefore, the interferences may be removed without distortion of signal interferences. The operations may optimize the procedure since they are performed with fewer signals and lower cost. It is noted that the smoothing and decimating operations may not be requisite. After that, the signals P1 and P2 are produced.

Figure 7:
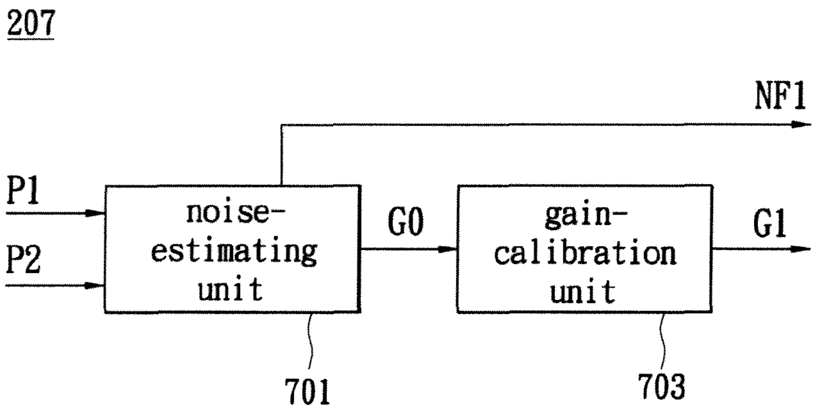
FIG. 7 shows function blocks of a noise-suppression unit of the system in accordance with the instant disclosure.

The signals P1 under the frequency domain transformation and the signals P2 are transmitted to the noise-suppression unit 207. FIG. 7 shows the functional blocks of the noise-suppression unit 207 in accordance with the present disclosure.

The noise-suppression unit 207 may be implemented by software or the tangible circuits. However, this back-end means of noise suppression may be ignored since it is optional in the present disclosure.

The noise-estimating unit 701 mainly performs a process of non-linear noise suppression. This process estimates the environmental noise according to the signals P1 and P2. The gain (G0) used for gain control is also calculated. In the meantime, the signals NF1, that is the reference signals input to the calibration unit 203, are generated. The signal NF1 indicates whether or not the signals are mainly with environmental noise. For example, NF1 equaling to 1 shows the signals are the environmental noise; NF1 is 0 since the signals are mainly the main audio portion. The gain (G0) can be used as the gain (G1) for noise suppression if it undergoes the treatment of the gain-calibration unit 703.

Figure 8:
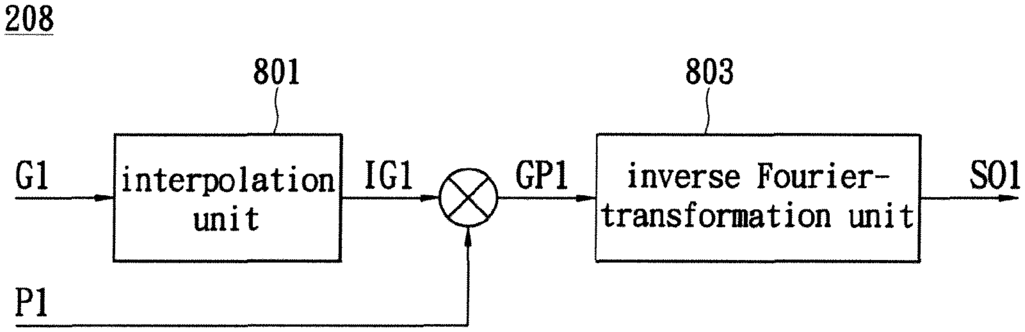
FIG. 8 shows function blocks of a inverse frequency-domain transformation unit of the system in accordance with the instant disclosure.

The gain (G1) is transmitted to the inverse frequency-domain transformation unit 208. The inverse frequency-domain transformation unit 208 receives the signals P1 with main audio portion. The gain (G1) is referred to suppress noise in the signals. FIG. 8 shows functional blocks of an inner-implemented inverse frequency-domain transformation unit 208.

The gain (G1) generated after the non-linear noise suppression process can effectively suppress the noise in the signals of main audio portion. The gain (G1) is modulated to gain (IG1) for the time domain signals by the interpolation unit 801. The gain IG1 multiplied by signal P1 point by point is to generate the frequency-domain signal GP1. The signals are processed by the inverse Fourier-transformation unit 803, and output to the time-domain signals SO1.

The overlap-add-sum unit 209 is coupled to the inverse frequency-domain transformation unit 208. The overlap-add-sum unit 209 receives the output signals SO1, which are described by the waveforms in time domain. The overlap-add-sum unit 209 performs overlapping, adding, and summing operations on the waveforms, and outputs a sequence of audio signals.

Figure 9:
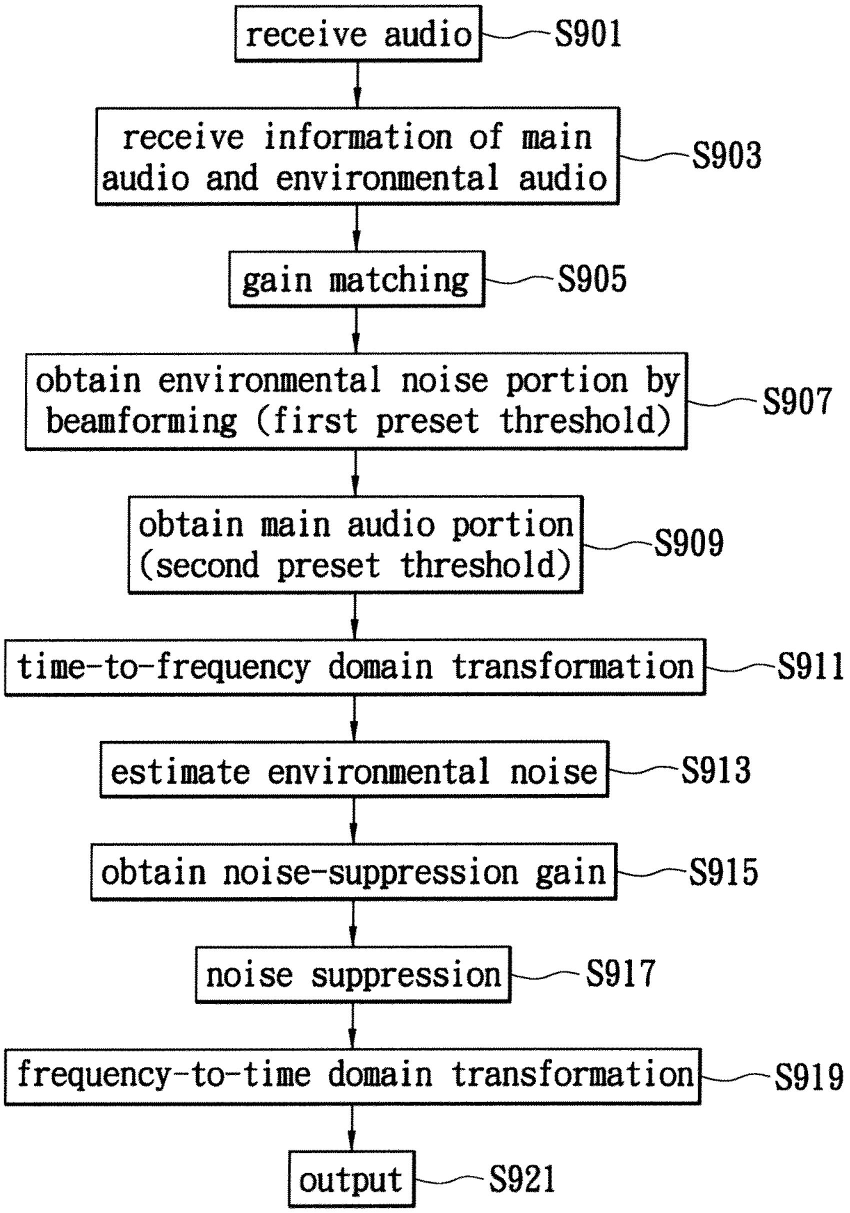
FIG. 9 is a flow chart illustrating the method of environmental noise cancellation of the instant disclosure.

By the abovementioned circuit modules, the application thereto can be described in the process of environmental noise cancellation in FIG. 9.

The every functional block in the figure can be implemented by means of software. The related procedure may be stylized into an embedded chip, or installed into the memory of the processor in the system.

The microphone array at least has the first microphone module mainly receiving the main audio portion, and the second microphone module receiving most of the environmental noise. The microphone array is particularly applied to a communication device, and effectively improving the call quality by suppressing its environmental noise during a call procedure. Reference is made to FIG. 9 illustrating the process of environmental noise cancellation.

As a receiver module, such as the microphone array, collects audio (step S901), at least two groups of signals are included. A calibration scheme is now introduced to reducing the error caused by the variation among the microphones. The calibration includes a gain matching process. The calibration unit receives the information with respect to the main audio and environmental sound. The information preferably includes the references made to the previous signals with main audio portion or the environmental noise portion (step S903). The information is conducted to define a gain, thereby to apply the gain upon the signals for calculation. The signals include the main audio portion and the environmental noise portion the microphone array receives (step S905). Since the calibration is an ongoing process, the system may keep track of the microphone and its condition and provide good call quality.

The signals undergoing the gain matching process (in step S905) are then treated by the beamforming process. The beamforming process is particularly configured to adjust the state of reception for each microphone module. Exemplarily, the beamforming process may determine whether the difference between signals received by the two microphone modules exceeds a preset threshold (e.g. the first preset threshold), and accordingly adjust the degree of filtering for effectively obtaining the environmental noise portion (step S907).

Following the step S905, the step S907 is further used to acquire the environmental noise portion which has comparatively few main audio. The obtained environmental noise portion is compared with the calibrated main audio portion from the first microphone module, and a difference therebetween is obtained. The difference is then compared with another preset threshold (e.g. the second preset threshold), and thereby adjusting the degree of filtering for extracting the main audio portion (step S909).

Through the steps S905 and S907, the signals of the environmental noise portion and the main audio portion are then acquired. The time-to-frequency domain transformation is performed afterward (step S911). A fast Fourier transformation is preferably used to transform the signals from time domain to frequency domain. Optionally, smoothing and decimating operations are performed onto the signals for obtaining a suitable signal resolution. At last; the overlapping and adding process is used to restore the signals. The described process particularly uses limited resources for acquiring improved call quality.

After the time-frequency domain transformation, a nonlinear noise suppression is conducted to estimate the portion of environmental noise from the two sets of signals (step S913). Therefore, a noise-suppression gain is obtained (step S915).

This noise-suppression gain is performed onto the continuous audio signals in the frequency domain (step S917). Those signals are transformed into the time domain, for example, by the fast Fourier transformation in step S919. The signals then undergo the overlapping and summing process, and the output to air (step S921).

It is worth noting that the system and method of environmental noise cancellation may particularly be applied on the device with two inputs.

In summation of the above description, in the disclosed system of environmental noise cancellation, the steps of signal calibration, beamforming, speech extraction, frequency/time domain transformation, noise suppression and overlapping are performed onto the signals from the microphone array in real time. So that, the system may adaptively change the gain according to the various conditions. The environmental noise can be effectively suppressed. The system can raise the definition and comfortability during the call procedure. Furthermore, the adoption of the microphone may have great flexibility.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A system with environmental noise cancellation, comprising:

a calibration unit, coupled to a first microphone module and a second microphone module, wherein the calibration unit receives signals with majority of main audio from the first microphone module and signals with majority of environmental audio from the second microphone module, and calibrates definition of first microphone module or second microphone module according to as least one feedback information;

a beamforming unit, coupled to the calibration unit, receiving the calibrated signals of the first and second microphone modules and modulating the signals to be an interference pattern based on requirement, and generating signals with comparatively few main audio portion;

a speech extracting unit, coupled to the beamforming unit, receiving the signals with comparatively few main audio portion and the calibrated signals of the first microphone module, and then outputting signals with speech extraction after filtering, and generating the feedback information with respect to main audio for the calibration unit to calibrate the first microphone module or the second microphone module;

a frequency-domain transformation unit, coupled to the speech extracting unit, receiving the signals with comparatively few main audio portion and signals with speech extraction, and performing a frequency domain transformation;

a noise-suppression unit, coupled to the frequency-domain transformation unit, receiving signals with frequency domain transformation, and calculating a gain for noise suppression, and further generating the feedback information with respect to environmental noise for the calibration unit to calibrate the first microphone module or the second microphone module;

an inverse frequency-domain transformation unit, coupled to the noise-suppression unit, performing noise suppression with the gain and performing a time domain transformation; and an overlap-add-sum unit, coupled to the inverse frequency-domain transformation unit, forming a continuous audio with operations of overlapping, adding and summing.

2. The system of claim 1, wherein the first microphone module is installed near mouth for receiving the signal mainly with the main audio; the second microphone module is installed in a distance from the first microphone module for receiving the signals mainly with the environmental audio.

3. The system of claim 1, wherein information related to main audio or the environmental audio includes the information, generated by the speech extracting unit, used to determine if the signals are the main audio portion, and the information, generated by the noise-suppression unit, used to determine if the signals are the noise.

4. The system of claim 3, wherein the speech extracting unit includes a speech-confirm unit for generating the information used to determine if the signals are the main audio portion; the noise-suppression unit includes a noise-estimating unit for generating the information used to determine if the signals are the noise.

5. The system of claim 1, wherein the time-frequency domain transformation is performed by a fast Fourier transformation.

6. The system of claim 5, wherein the signals through the frequency domain transformation is then process by a smoothing operation and a decimating operation.

7. The system of claim 5, wherein a reverse fast Fourier transformation is further used to perform the frequency-time domain transformation.

8. The system of claim 1, wherein the noise-suppression unit performs a non-linear noise suppression.

9. The system of claim 8, wherein the noise-suppression unit includes a noise-estimating unit used to perform the non-linear noise suppression.

10. The system of claim 1, wherein beamforming unit has a filtering unit which employs a first preset threshold to define a filter coefficient of the filtering unit, and accordingly generates the signal with comparatively few main audio portion.

11. The system of claim 10, wherein the speech extracting unit has another filtering unit which employs a second preset threshold to define another filter coefficient, and generates the signals with the main audio portion accordingly.

12. An apparatus having two inputs applied to the system for environmental noise cancellation as recited in claim 1.

13. A method for environmental noise cancellation, comprising:

receiving signals with a main audio portion and an environmental noise portion from a receiver module;

receiving feedback information with respect to main audio and feedback information with respect to environmental noise;

determining a gain based on the feedback information with respect to main audio and the feedback information with respect to environmental noise;

applying the gain to calibrate the main audio portion or the environmental noise portion of the signals received by the receiver module;

performing a beamforming process to generate the signals with comparatively few main audio portion;

comparing the signal with comparatively few main audio portion with the calibrated signals of the main audio portion; and outputting speech signals with speech extraction after filtering, and the feedback information with respect to main audio for calibrating the receiver module;

performing a time-frequency domain transformation upon the signals with comparatively few main audio portion and the speech signals with speech extraction;

estimating an environmental noise by performing an operation of non-linear noise suppression;

obtaining a noise-suppression gain; and outputting the feedback information with respect to environmental noise for calibrating the receiver module;

processing a noise-suppression; and performing a frequency-time domain transformation.

14. The method of claim 13, wherein the beamforming process is used to determine whether or not a difference between the audio signals received by the two inputs of the receiver module exceeds a preset threshold, and accordingly to adjust degree of filtering for obtaining the signals with comparatively few main audio portion.

15. The method of claim 14, wherein another preset threshold is used to compare with the difference between the signals with comparatively few main audio portion and the calibrated signals with main audio portion, and thereby to generate the main audio portion after filtering.

16. The method of claim 13, wherein the time-frequency domain transformation is performed by a fast Fourier transformation process.

17. The method of claim 16, wherein the signals undergoing the fast Fourier transformation is then processed by a smoothing operation.

18. The method of claim 17, wherein the signals undergoing the smoothing operation is then processed by a decimating operation.

19. The method of claim 13, wherein the signals undergoing the frequency-time domain transformation are output after processes of overlapping and summing.

20. The method of claim 13, wherein the beamforming process employs a first preset threshold to define a filter coefficient and thereby to generate the signals with comparatively few main audio portion; a second preset threshold is introduced into defining another filter coefficient, and accordingly generating the signals with the main audio portion.

* * * * *